US009626755B2

(12) United States Patent
Tsuchiya et al.

(10) Patent No.: US 9,626,755 B2
(45) Date of Patent: Apr. 18, 2017

(54) MASK INSPECTION APPARATUS AND MASK INSPECTION METHOD

(71) Applicant: NuFlare Technology, Inc., Yokohama (JP)

(72) Inventors: Hideo Tsuchiya, Tokyo (JP); Nobutaka Kikuiri, Kanagawa (JP); Ikunao Isomura, Kanagawa (JP)

(73) Assignee: NuFlare Technology, Inc., Yokohama (JP)

( * ) Notice: Subject to any disclaimer, the term of this patent is extended or adjusted under 35 U.S.C. 154(b) by 0 days.

(21) Appl. No.: 14/802,563

(22) Filed: Jul. 17, 2015

(65) Prior Publication Data

US 2016/0042505 A1 Feb. 11, 2016

(30) Foreign Application Priority Data

Aug. 8, 2014 (JP) ................. 2014-162396

(51) Int. Cl.
*G06T 7/00* (2006.01)
(52) U.S. Cl.
CPC .... *G06T 7/001* (2013.01); *G06T 2207/20148* (2013.01); *G06T 2207/30148* (2013.01)
(58) Field of Classification Search
None
See application file for complete search history.

(56) References Cited

U.S. PATENT DOCUMENTS

| | | | |
|---|---|---|---|
| 4,805,123 A * | 2/1989 | Specht | G01N 21/95607 348/126 |
| 7,577,288 B2 * | 8/2009 | Yamashita | G01N 21/95607 382/144 |
| 8,442,320 B2 * | 5/2013 | Isomura | G01N 21/95607 382/181 |

FOREIGN PATENT DOCUMENTS

| | | |
|---|---|---|
| JP | 2013-064632 | 4/2013 |
| JP | 2013-167608 | 8/2013 |
| JP | 2014-181966 | 9/2014 |

OTHER PUBLICATIONS

Office Action issued on Jun. 30, 2016 in Korean Patent Application No. 10-2015-0110714 (with English translation).

* cited by examiner

*Primary Examiner* — Chan Park
*Assistant Examiner* — Geoffrey E Summers
(74) *Attorney, Agent, or Firm* — Oblon, McClelland, Maier & Neustadt, L.L.P.

(57) ABSTRACT

In a mask inspection apparatus, an optical image acquisition unit acquires an optical image of a pattern in a mask by irradiating light. A reference image generation unit generates a corresponding reference image. A defect detection unit detects a defect of the pattern by comparing the two images. A misplacement data processing unit obtains a misplacement amount of the pattern from the images, and generates misplacement data. A misplacement map processing unit generates and outputs the map to the defect detection unit. The defect detection unit includes, a first comparison unit for comparing the images, a threshold value reconfiguring unit for specifying a portion of the map corresponding to the defect detected, reconfiguring a threshold value according to the shape of the defect and the misplacement direction of the optical image of the specified portion, and a second comparison unit for re-comparing both images using the reconfigured threshold value.

8 Claims, 13 Drawing Sheets

FIG. 6A

|  | Optical Image Deviated Leftward | Optical Image Deviated Rightward |
|---|---|---|
| Defect Convex Leftward | Threshold Decreased | Threshold Increased |
| Defect Convex Rightward | Threshold Increased | Threshold Decreased |
| Defect Concave Leftward | Threshold Increased | Threshold Decreased |
| Defect Concave Rightward | Threshold Decreased | Threshold Increased |

FIG. 6B

|  | Optical Image Deviated Upward | Optical Image Deviated Downward |
|---|---|---|
| Defect Convex Upward | Threshold Decreased | Threshold Increased |
| Defect Convex Downward | Threshold Increased | Threshold Decreased |
| Defect Concave Upward | Threshold Increased | Threshold Decreased |
| Defect Concave Downward | Threshold Decreased | Threshold Increased |

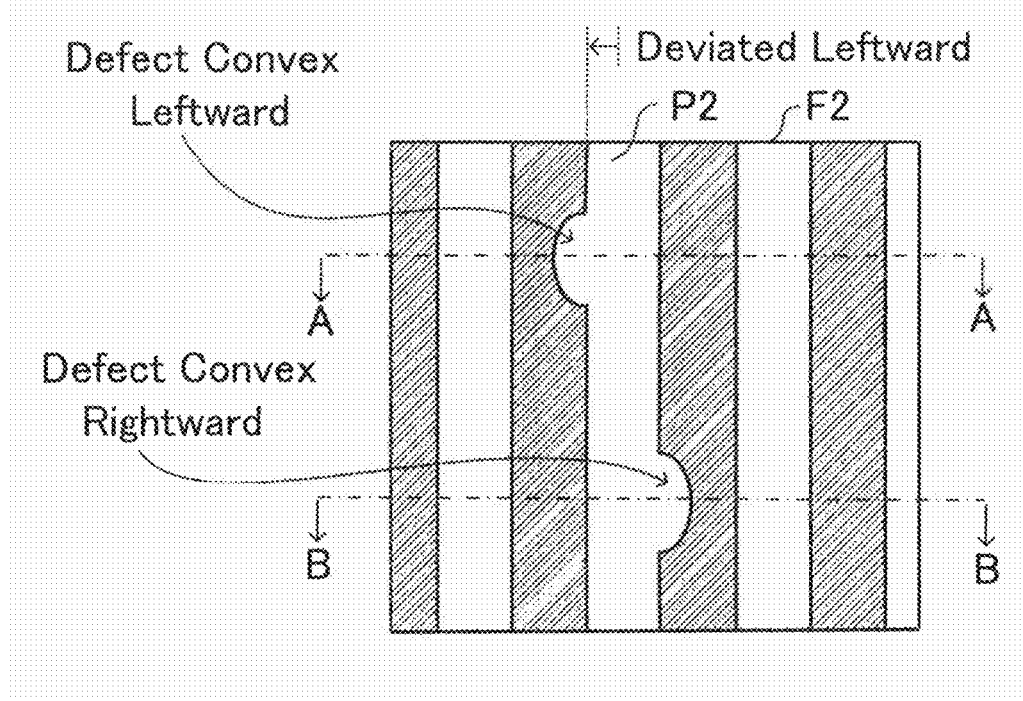

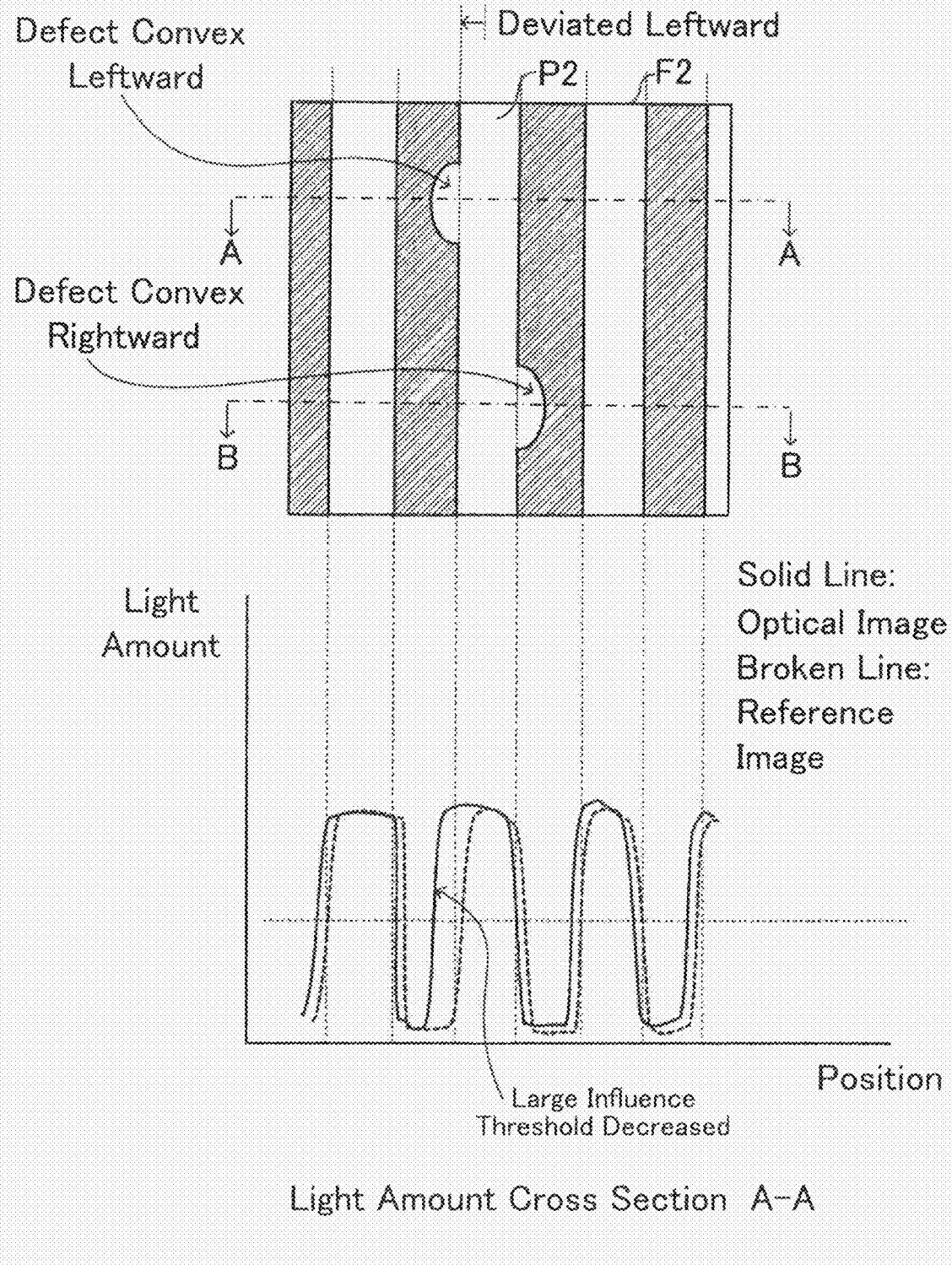

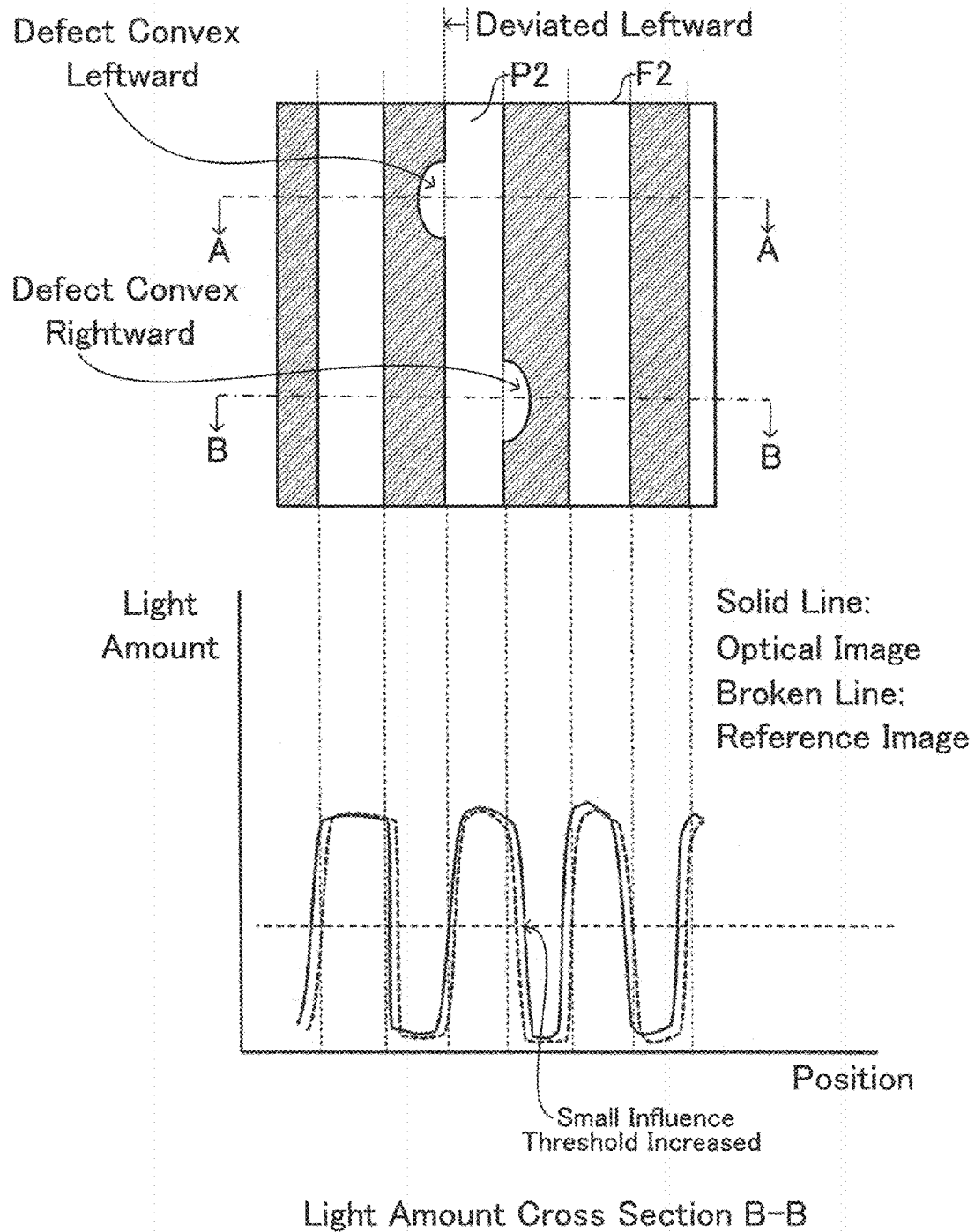

MASK INSPECTION APPARATUS AND MASK INSPECTION METHOD

CROSS-REFERENCE TO THE RELATED APPLICATION

The entire disclosure of the Japanese Patent Application No. 2014-162396, filed on Aug. 8, 2014 including specification, claims, drawings, and summary, on which the Convention priority of the present application is based, are incorporated herein in its entirety.

FIELD OF THE INVENTION

The present invention relates to a mask inspection apparatus and a mask inspection method.

BACKGROUND

With high integration and large capacity of a Large Scale Integration (LSI), a circuit dimension required for a semiconductor element has become increasingly narrowed. By using an original image pattern (that is, a mask or a reticle, hereinafter collectively referred to as a mask) in which a circuit pattern is formed, the pattern is exposed and transferred onto a wafer by a reduction projection exposure apparatus, called a stepper or a scanner, to form a circuit on the wafer, thereby producing a semiconductor element.

Since LSI production requires a large manufacturing cost, it is crucial to improve the production yield. On the other hand, in a contemporary semiconductor device, a pattern having a line width from ten nanometers to twenty nanometers is required to be formed. At this point, a defect of the mask pattern can be cited as a large factor of degradation in the production yield. As the dimensions of an LSI pattern to be formed on a semiconductor wafer becomes finer, the defect of the mask pattern becomes finer.

As fluctuations of various process conditions are absorbed by enhancing dimensional accuracy of the mask, it is necessary to detect the defect of the extremely small pattern in a mask inspection. Therefore, high accuracy is required for an inspection apparatus that inspects patterns of a mask.

In the mask inspection apparatus, light emitted from a light source is irradiated onto a mask through an optical system. The mask is loaded and chucked on a stage, and the illuminated light scans the mask by movement of the stage. The light transmitted through or reflected by the mask, images on a sensor through lenses of an optical system. Then, the defect inspection with respect to the mask is performed based on the optical images acquired by the sensor.

A die-to-die comparison inspection method and a die-to-database comparison inspection method are known as examples of mask inspection methods performed using the mask inspection apparatus. In the die-to-die comparison method, an optical image of a pattern and another optical image of the identical pattern at a different position are compared with each other. On the other hand, in the die-to-database comparison method, a reference image generated from design data used in mask production and an optical image of the actual pattern formed in the mask are compared with each other.

In both of the inspection methods, using a proper defect determination logic (algorithm), a reference image is compared with an image in which a defect determination should be performed. The defect determination is performed when a defect reaction value calculated using the defect determination logic (algorithm) exceeds a predetermined defect determination threshold value.

A plurality of defect determination logics (algorithms) are simultaneously used, for example, level comparison and derivative value comparison. In the level comparison, luminance values in pixels of identical pattern portions of the reference image (a first die image or the reference image) and the inspection target image (a second die image or the optical image of the actual mask pattern) are compared with each other. In the derivative value comparison, a derivative value in a pattern tangential direction of the reference image is compared with a derivative value in a pattern tangential direction of a corresponding portion of the inspection target image. In both of the level comparison and the derivative value comparison, the defect reaction value calculated using the defect determination logic (algorithm) is increased along with an increase of the influence of the defect.

For this reason, in each defect determination logic (algorithm), the defect reaction value equivalent to the permissible influence of the defect is defined as a defect determination threshold value, the defect determination is performed when the defect reaction value exceeds the defect determination threshold value, and detection sensitivity of the defect determination is fixed. The plurality of defect determination logics (algorithms) are concurrently applied, and the defect determination is performed when one of the defect determination logics (algorithms) exceeds the defect determination threshold value.

The defect determination threshold value is a criterion that is used to determine the defect when the defect reaction value exceeds the defect determination threshold value. Therefore, when a numerical value of the defect determination threshold value is increased, the defect determination threshold value acts to permit a large error caused by the defect. On the other hand, when the numerical value of the defect determination threshold value is decreased, the defect determination threshold value acts to permit a small error caused by the defect.

For the die-to-database comparison inspection method, it can be concluded that the reference image generated from the design pattern data is always correct, and it can be concluded that the defect exists in the optical image of the actual mask pattern when the defect reaction value of the defect determination logic (algorithm) exceeds the defect determination threshold value. For the die-to-die comparison inspection method, when the defect is included in one of the first die image and the second die image, the defect reaction value of the defect determination logic (algorithm) exceeds the defect determination threshold value, and thereby the defect determination is performed. In this case, after the inspection, an operator performs a review to confirm the defect, and the defective die is identified.

In order to acquire an optical image, a charge accumulation type time delay integration (TDI) sensor and a sensor amplifier that amplifies the output of the TDI sensor are used. In a case of a half-tone type phase shift mask inspection using a transmitted light, a defect is determined by recognizing a mask pattern by a light signal intensity of the acquired sensor image through the detection optical system like a chrome mask, because the sensor image has enough contrast between the light shielding film and the glass substrate of the halftone type phase shift mask.

Depending on the shape of the defect, the reflection image may have a favorable contrast, so there is also an inspection method using a reflection inspection optical system for the purpose of a particle inspection function or the like. In addition, there is adopted a method of performing defect inspection with high detection sensitivity by correcting out-of-focus of transmitted irradiation light by a variation in a thickness of a mask.

The defect of the mask is determined based on whether the line width or the amount of misplacement other than the shape defect falls within a predetermined error range. Specifically, irregularities (edge roughness) of a pattern edge, a line width abnormality of the pattern, and an abnormality of a gap between patterns adjacent to each other due to the misplacement can be cited as an example. The amount of misplacement is determined by comparing the reference image generated from a database as a reference to a X-direction error and a Y-direction error of an edge position of the optical image using the proper defect determination logic (algorithm). There is also disclosed a method for producing a misplacement map (for example, see JP 2013-064632 A). In the defect determination logic (algorithm) suitable for the calculation of the X-direction error and the Y-direction error, the defect reaction value is calculated according to an amount of size error, the defect reaction value equivalent to the permissible size error is defined as the defect determination threshold value, and the determination of a misplacement defect is made when the defect reaction value exceeds the defect determination threshold value. A variation within the size error of a permissible degree of misplacement is recorded in the misplacement map.

In the embodiment, the defect shape of the mask and the convex or concave pattern are described based on the transmitted light image. That is, the term "the pattern is convex" means that a white portion is seen as convex in the transmitted light image, and the term "the pattern is concave" means that the white portion is seen as concave in the transmission image.

As described above, the amount of misplacement is obtained by measuring the X-direction error and the Y-direction error of the edge position of the optical image with respect to the reference image generated from the database as a reference. However, when the convex defect or the concave defect is generated in a specific direction, the measured misplacement amount has a negative influence on the alignment between layers in a multi-layer construction, and a potential margin is widened.

In the mask inspection, the defect is detected by comparing the reference image and the optical image in a rectangular region (hereinafter, referred to as a frame) having a size of several tens of micrometers in the mask. An amount of misplacement of the pattern is measured before alignment is performed on the misplacement of the pattern between the reference image and the optical image in the frame. Then a map of the amount of misplacement of the pattern in the mask surface, namely, the misplacement map is generated. Therefore, in the mask inspection, it is necessary to more accurately perform the defect determination by simultaneously using the misplacement map.

The present invention has been devised to solve the problem described above. An object of the present invention is to provide a mask inspection apparatus and mask inspection method for being able to improve the inspection accuracy of the defect determination by simultaneously using the misplacement map in the mask defect inspection when the convex defect or the concave defect is generated in a direction in which the misplacement is generated on the observed pattern.

SUMMARY OF THE INVENTION

According to one aspect of the present invention, a mask inspection apparatus includes an optical image acquisition unit, a reference image generation unit, a defect detection unit, a misplacement data processing unit, and a misplacement map processing unit. The optical image acquisition unit acquires an optical image of a pattern formed in a mask by irradiating light on the mask. The reference image generation unit generates a reference image corresponding to the optical image from design data of the pattern. The defect detection unit detects a defect of the pattern by comparing the optical image with the reference image. The misplacement data processing unit obtains a misplacement amount of the pattern from the optical image and the reference image, and generates misplacement data using the misplacement amount and the coordinates of the pattern. The misplacement map processing unit generates a misplacement map from the misplacement data, and outputs the misplacement map to the defect detection unit, the misplacement map being in-plane distribution data of the mask. The defect detection unit includes a first comparison unit to compare the optical image and the reference image using a defect determination logic algorithm, a threshold value reconfiguring unit to specify a portion of the misplacement map corresponding to a portion of the defect detected by the first comparison unit, and to reconfigure a threshold value of the defect determination algorithm according to the shape of the defect and the misplacement direction of the optical image with respect to the reference image of the specified portion, and a second comparison unit to re-compare the reference image and optical image of the specified portion using the reconfigured threshold value.

According to another aspect of the present invention, a mask inspection method for inspecting a defect of a pattern formed in a mask by irradiating the mask with light, the method includes irradiating the mask with light to acquire an optical image of the pattern. A reference image corresponding to the optical image from design data of the pattern is generated. A defect of the pattern by comparing the optical image with the reference image using a defect determination algorithm is detected. A misplacement amount of the pattern from the optical image and the reference image is obtained. Misplacement data using the misplacement amount and the coordinates of the pattern is generated. A misplacement map based on the misplacement data, the misplacement map being in-plane distribution data of the mask is generated. In the detecting of the defect of the pattern, a portion of the misplacement map corresponding to a portion of the defect detected by comparing the optical image with the reference image is specified, and the threshold value of the defect determination algorithm according to the shape of the defect and the misplacement direction of the optical image with respect to the reference image of the specified portion, is reconfigured, and the reference image and optical image of the specified portion using the reconfigured threshold value are re-compared.

BRIEF DESCRIPTION OF THE DRAWINGS

FIG. 6A is a list of reconfiguration of threshold values according to the present embodiment.

FIG. 6B is a list of reconfiguration of threshold values according to the present embodiment.

FIG. 7B is a schematic view illustrating an example of a frame.

FIG. 8 is a light amount distribution diagram illustrating a distribution of a light amount.

FIG. 9 is a light amount distribution diagram illustrating a distribution of a light amount.

DETAILED DESCRIPTION OF THE EMBODIMENT

Figure 1:
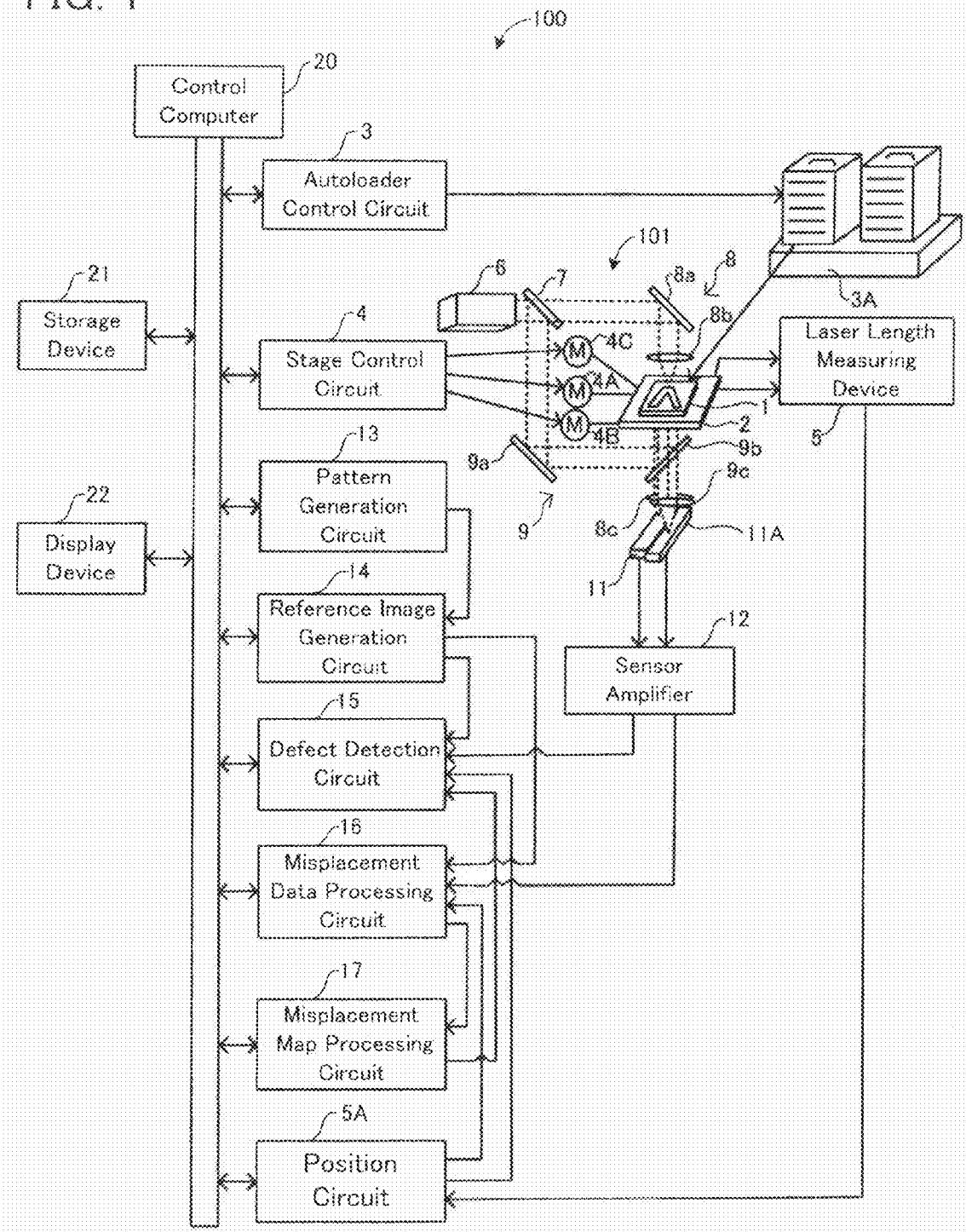
FIG. 1 is a schematic diagram illustrating a configuration of a mask inspection apparatus according to the present embodiment.

The embodiments will now be described with reference to the accompanying drawings, wherein the same reference numerals designate corresponding or identical elements throughout the various drawings.

FIG. 1 is a schematic diagram illustrating a configuration of a mask inspection apparatus 100 as one embodiment of a mask inspection apparatus according to the present invention.

In the mask inspection apparatus 100, a light is irradiated on the mask 1 to inspect defects of patterns formed in the mask 1 as shown in FIG. 1. In FIG. 1, a configuration unit necessary in the present embodiment is illustrated. However, another well-known configuration unit necessary for an inspection may also be included. As used herein, a "unit" or "circuit" can be configured by a program operating on a computer. Alternatively, the "unit" or "circuit" may be constructed by, not only a software program, but also a combination of software, hardware, or firmware. In the case that the "unit" or "circuit" may be constructed by a program, the program can be recorded in a recording device such as a magnetic disk device.

As shown in FIG. 1, the optical image acquisition unit 101 for acquiring an optical image includes a stage 2, an autoloader control circuit 3, an autoloader 3A, a stage control circuit 4, motors 4A, 4B, 4C, a laser length measuring device 5, a position circuit 5A, a light source 6, a beam splitter 7, optical systems 8 and 9, TDI sensors 11, 11A, and a sensor amplifier 12. Each component of the mask inspection apparatus 100 will be described as follows.

The mask inspection apparatus 100 includes a stage 2 that holds the mask 1 as an inspection target. The mask 1 is conveyed on the stage 2 from an autoloader 3A. The autoloader 3A is controlled by an autoloader control circuit 3.

The stage 2 is driven in an X-direction, a Y-direction, and a θ direction by an X-direction motor 4A, a Y-direction motor 4B, and a θ-direction (horizontal rotating direction) motor 4C, as an example of a driving unit. The driving control of the motors 4A, 4B, and 4C is performed by a stage control circuit 4.

Figure 2:
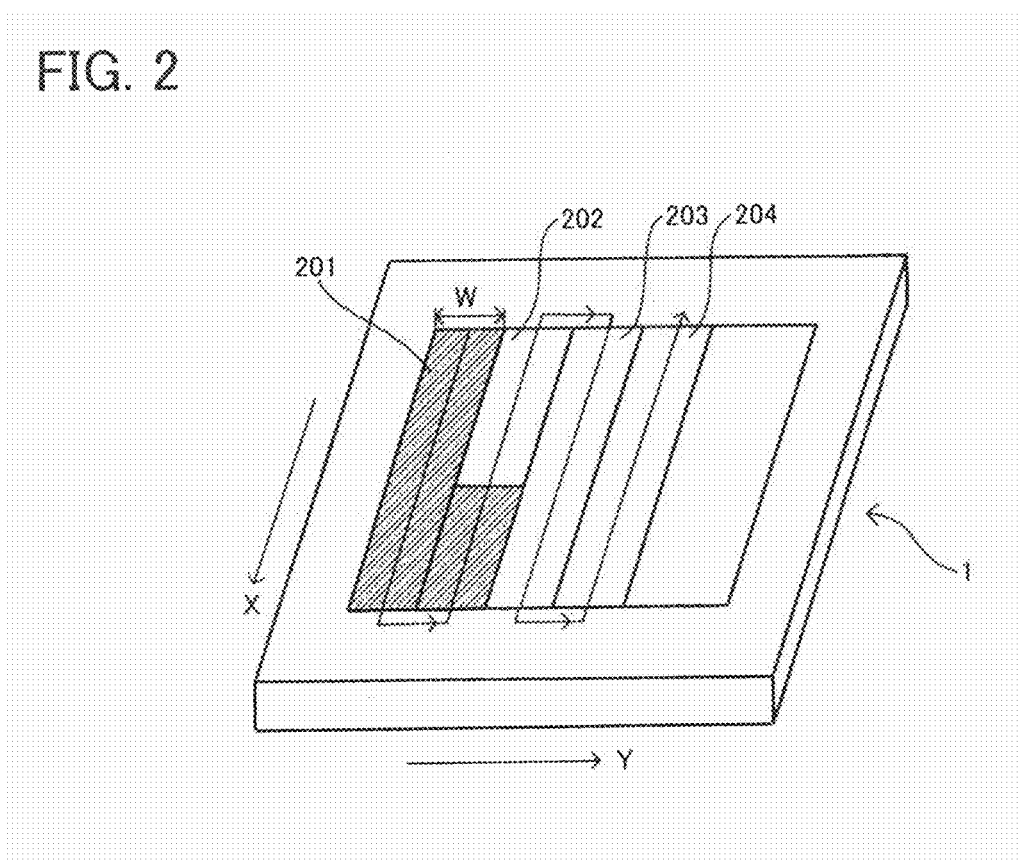
FIG. 2 is a schematic diagram illustrating an acquisition procedure of an optical image.

As an example, positions of the stage 2 in the X-direction and Y-direction are detected by a laser length measuring device 5 such as a laser interferometer, and a position circuit 5A connected to the laser length measuring device 5. For example, as shown in FIG. 2, the optical images of the mask 1 are acquired by the sensor while the mask 1 continuously moves at a constant speed in the X-direction. After the mask 1 is moved to the end (stripe end) of the X-direction, the mask is moved in the Y-direction, the optical images are then acquired by the sensor while the mask 1 continuously moves at a constant speed in a direction opposite to the X-direction. The optical images of the whole inspection area of the mask 1 are acquired by repeating the above-mentioned process.

The mask inspection apparatus 100 also includes a light source 6 to emit a laser beam as an example of a light irradiation device. The mask inspection apparatus 100 includes an optical system 8 that transmits the laser beam emitted from the light source 6 by irradiating the laser beam on the mask 1 through a beam splitter 7, and an optical system 9 that reflects the laser beam emitted from the light source 6 by irradiating the laser beam on the mask 1 through the beam splitter 7.

The optical system 8 includes a mirror 8a, an objective lens 8b, and an objective lens 8c that forms an image with transmitted light on a TDI sensor 11 as an example of an image sensor. The optical system 9 includes a mirror 9a, a beam splitter 9b, and an objective lens 9c that forms an image with reflected light on a TDI sensor 11A as an example of an image sensor. Hereinafter, in a case where there is no need to distinguish the optical system 8 from the optical system 9, the same descriptions as the configuration of the optical system 8 will be used for the optical system 9.

The TDI sensor 11 is comprised of a two-dimensional CCD sensor having an imaging region of 2,048 pixels×512 pixels (144 μm×36 μm in a case where 1 pixel is 70 nm×70 nm), as one example. That is, the TDI sensor 11 is configured by a plurality of stages (for example, 512 stages) of lines in an accumulation direction. Each of the lines L is configured by a plurality of pixels (for example, 2,048 pixels).

The TDI sensor 11 is installed such that the accumulation direction (direction of 512 stages) of the TDI sensor 11 is matched with the X-direction of the stage 2, and the TDI sensor 11 is moved relative to the mask 1 in response to the movement of the stage 2. In this way, the image of the pattern of the mask 1 is captured by the TDI sensor 11.

When the moving direction of the stage 2 is reversed, the accumulation direction of the TDI sensor 11 is also reversed, as the result, the TDI sensor 11 is moved relative to the mask 1. In the mask inspection apparatus 100 according to the present embodiment, the TDI sensor 11 is used as the image sensor, however another sensor such as a line sensor or an area sensor may be used instead of the TDI sensor 11.

The TDI sensor 11 is connected with the sensor amplifier 12. A light amount signal of each pixel input from the TDI sensor 11 is converted to a normalized optical image by the sensor amplifier 12. The optical image output from the sensor amplifier 12 is input to the defect detection circuit 15, as one example of a defect detection unit, and a misplacement data processing circuit 16, as one example of a misplacement data processing unit, together with data output from the position circuit 5A indicating a position of the mask 1 on the stage 2.

FIG. 2 is a schematic diagram illustrating an acquisition procedure of the optical image of the pattern formed in the mask 1. The procedure wherein the mask inspection apparatus 100 acquires an optical image of the pattern formed in the mask 1 will be described.

It is assumed that the mask 1 as shown in FIG. 2 is positioned on the stage 2 as shown in FIG. 2. The inspection region in the mask 1 is virtually divided into the strip-shaped multiple inspection regions, namely, stripes $20_1$, $20_2$, $20_3$, $20_4$, . . . as illustrated in FIG. 2. For example, each stripe is a region having the width of several hundred micrometers and the length of about one hundred millimeters corresponding to the total length in the X-direction or Y-direction of the mask 1.

The optical image is acquired in each stripe. That is, in acquiring the optical image as shown in FIG. 2, the operation of the stage 2 is controlled such that each stripe $20_1$, $20_2$, $20_3$, $20_4$, . . . is continuously scanned. Specifically, the optical image of the mask 1 is acquired while the stage 2 is moved in the −X-direction as shown in FIG. 2. The image having a scan width W as shown in FIG. 2 is continuously input to the TDI sensor 11 as shown in FIG. 1.

That is, the image of the second stripe $20_2$ is acquired after the image of the first stripe $20_1$ is acquired. In this case, after the stage 2 moves in the −Y-direction in a stepwise manner, the optical image is acquired while the stage 2 moves in the direction (X-direction) opposite to the direction (−X-direction) in which the image of the first stripe $20_1$ is acquired, and the image having the scan width W is continuously input to the TDI sensor 11.

In the case that the image of the third stripe $20_3$ is acquired, after moving the stage 2 in the −Y-direction in the stepwise manner, the stage 2 moves in the direction opposite to the direction (X-direction) in which the image of the second stripe $20_2$ is acquired, namely, the direction (−X-direction) in which the image of the first stripe $20_1$ is acquired. An arrow shown in FIG. 2 indicates the direction and sequence for acquiring the optical image, and a hatched portion indicates the region where the optical image has already been acquired.

The pattern images formed in the TDI sensors 11 are subjected to photoelectric conversion, and then they are then subjected to A/D (Analog to Digital) conversion by the sensor amplifier 12. After that, the sensor data (transmission optical image and reflection optical image) subjected to A/D conversion is sent from the sensor amplifier 12 to the defect detection circuit 15 and the misplacement data processing circuit 16.

Next, a reference image generation circuit 14 as one example of a reference image generation unit will be described. As shown in FIG. 1, the mask inspection apparatus 100 also includes a pattern generation circuit 13, and a reference image generation circuit 14 for generating a reference image with which the optical image is compared.

The pattern generation circuit 13 takes CAD data (drawing data) or the like stored in the storage device 21 and outputs the generated data to the reference image generation circuit 14. That is, the pattern generation circuit 13, for example, takes design data from the storage device 21 through the control computer 20 and converts it into binary or other multiple-bit image data (design image data).

The design data converted into binary or other multiple-bit image data (design image data) is sent from the pattern generation circuit 13 to the reference image generation circuit 14. The reference image generation circuit 14 performs the proper filtering to the design image data, that is, the graphic image data.

Figure 3:
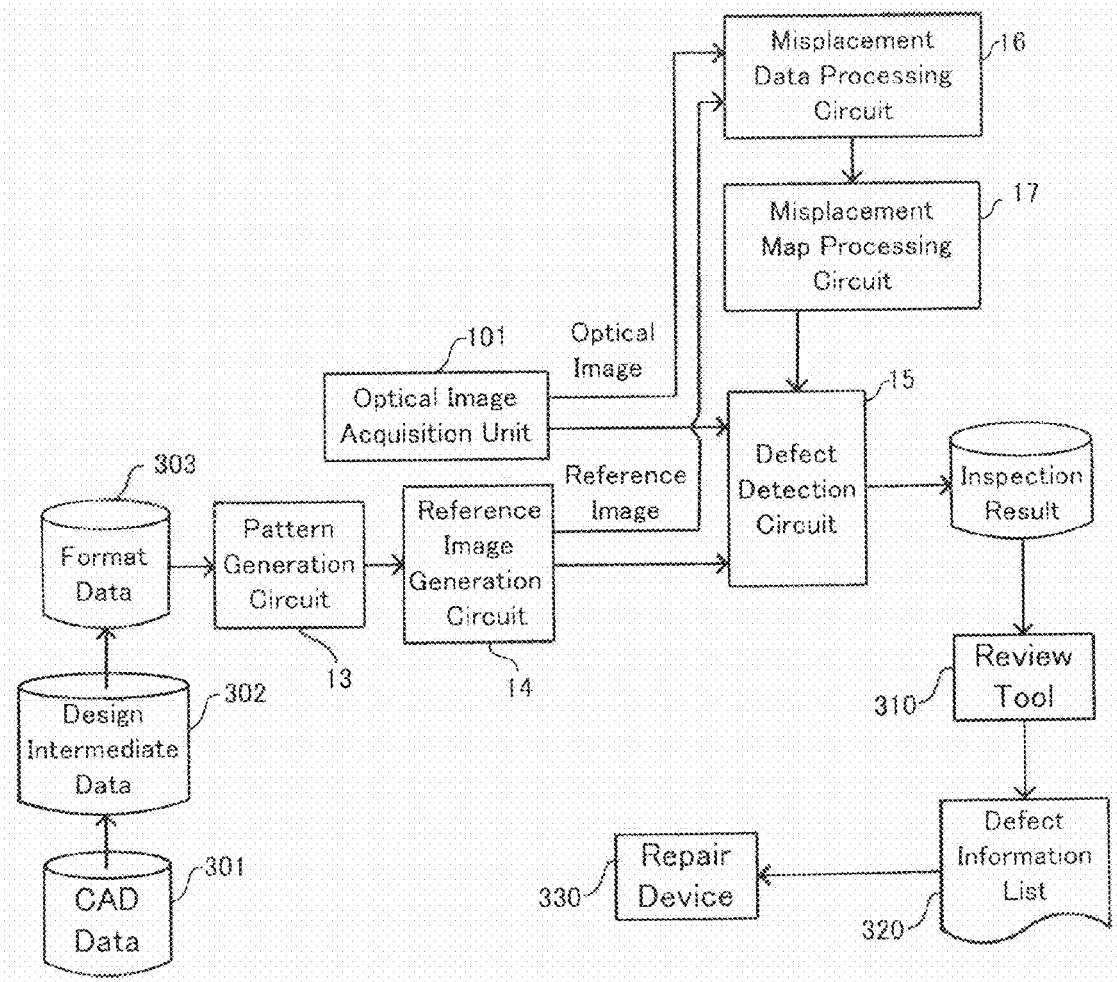
FIG. 3 is a schematic diagram illustrating a data flow according to the present embodiment.

A flow of data according to the present embodiment will be described. FIG. 3 is a schematic diagram showing the flow of data according to the present embodiment.

As shown in FIG. 3, CAD data 301 prepared by the designer (or user) is converted to design intermediate data 302 in a hierarchical format such as OASIS. The design intermediate data 302 includes data of the pattern to be formed on the mask created for each layer. However, the mask inspection apparatus 100 is not adapted to be able to directly read the design intermediate data 302 such as OASIS.

That is, each manufacturer of the mask inspection apparatus 100 uses different format data. Therefore, the design intermediate data 302 is converted, for each layer, to format data 303 as pattern data specific to the mask inspection apparatus 100, and the format data 303 is input to the mask inspection apparatus 100. Although the format data 303 may be data specific to the mask inspection apparatus 100, the format data 303 may also be data compatible with a writing apparatus.

The format data 303 is stored in, for example, the storage device 21 of the mask inspection apparatus 100. Further, a group of pattern features, defined in an area of approximately a few tens of micrometers square of the format data 303 is generally referred to as a "cluster" or "cell". It is common practice that the data is defined in a hierarchical structure using clusters or cells. A cluster or cell, which contains a pattern feature or features, may be used alone or repeated at certain intervals. In the former case the coordinate positions of the cluster (or cell) on the photomask are specified, whereas in the latter case the coordinate positions of each copy of the cluster (or cell) are indicated together with a repetition instruction.

Each cluster or cell is disposed in a strip-shaped region, referred to as a "frame" or "stripe", having a width of a few hundreds of micrometers and a length of approximately one hundred millimeters which correspond to the total length of the photomask in the X-direction or Y-direction.

In the format data 303 (design data), which is input to the storage device 21, data of a portion necessary for a pattern being observed is output to the pattern generation circuit 13 according to the progress of the mask inspection. The pattern generation circuit 13 interprets a graphic shape (graphic code), a graphic dimension, an arrangement position, and the like of the format data 303. Then, the pattern generation circuit 13 performs data generation processing of generating binary or other multiple-bit design image data as pattern data disposed at squares in units of grids of a predetermined quantization dimension.

The generated design image data calculates an occupancy rate occupied by the graphic in the design pattern with respect to each region (square) corresponding to the sensor pixel. The occupancy rate of the graphic in each pixel is a pixel value. The pattern data converted into the binary or other multiple-bit image data (bit pattern data) as described above is transmitted to the reference image generation circuit 14 that generates reference data (a reference image). The reference image generation circuit 14 generates a reference pattern by performing an appropriate image filtering process for comparison with a mask observation image.

Figure 4:
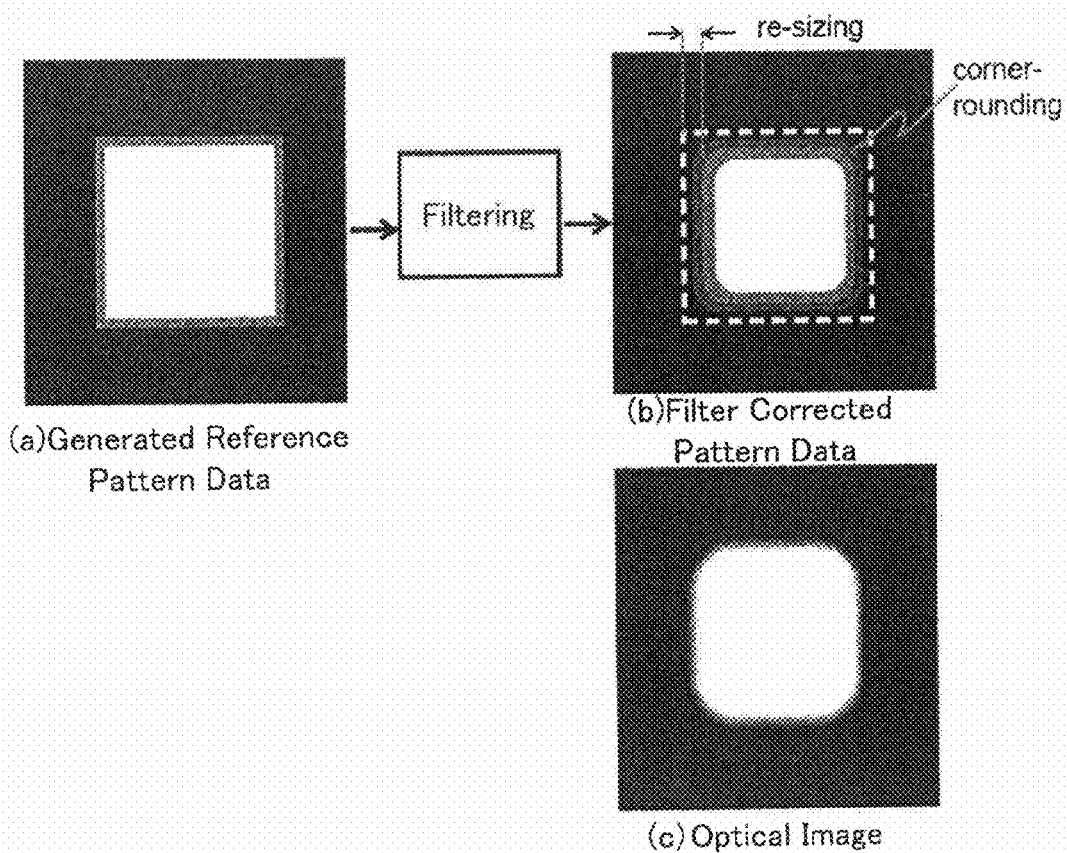
FIG. 4 is a diagram illustrating a filtering process.

FIG. 4 is a diagram illustrating a filtering process. An optical image (mask observation image) to be observed by an inspection apparatus is not exactly the same as a design pattern. Accordingly a reference image data is processed so as to be similar to the optical image by the filtering process. Specifically, the binary or other multiple-bit image data is processed so as to expand and contract line widths, and then an image diffusing filter is applied to simulate a corner of the pattern rounded in the mask production process.

Moreover, the optical image output from the sensor amplifier 12 is somewhat "blurred" due to the resolution characteristics of the enlarged optical system and due to the aperture effect in the photodiode array, that is, this optical image is a spatially low-pass filtered image.

By performing the filtering process to the design data that is binary or other multiple-bit image data at the design side, that is, performing a process so that the design pattern data matches to the optical image, the reference image that could be compared with the optical image with high accuracy, is generated. Accordingly, the mask 1 to be inspected is observed before the inspection, thereby a filtering coefficient that simulates the change due to the production process of the mask 1 and the optical system of the inspection apparatus, is obtained. A two-dimensional digital filtering process is then performed to the design pattern data to make the reference image similar to the optical image.

As described above, the reference image and the optical image is input to the defect detection circuit 15 to detect the defect, and input to the misplacement data processing circuit 16 to detect the misplacement amount of the pattern, and the misplacement data (a vector indicating a direction and magnitude of the misplacement) is generated together with the coordinate of the pattern.

The misplacement data processing circuit 16 processes the misplacement data, for example, in units of frames each of which is a rectangular region having a size of tens micrometers in the mask. The processed misplacement data is input to the misplacement map processing circuit 17, which is an example of the misplacement map processing unit, to generate the misplacement map that is of the in-plane distribution of the mask 1.

The defect detection circuit 15 will be described below with reference to FIG. 5. The reference image generated by the reference image generation circuit 14 and the optical image acquired by the optical image acquisition unit 101 are input to the defect detection circuit 15. The misplacement map generated by the misplacement map processing circuit 17 is also input to the defect detection circuit 15.

Figure 5:
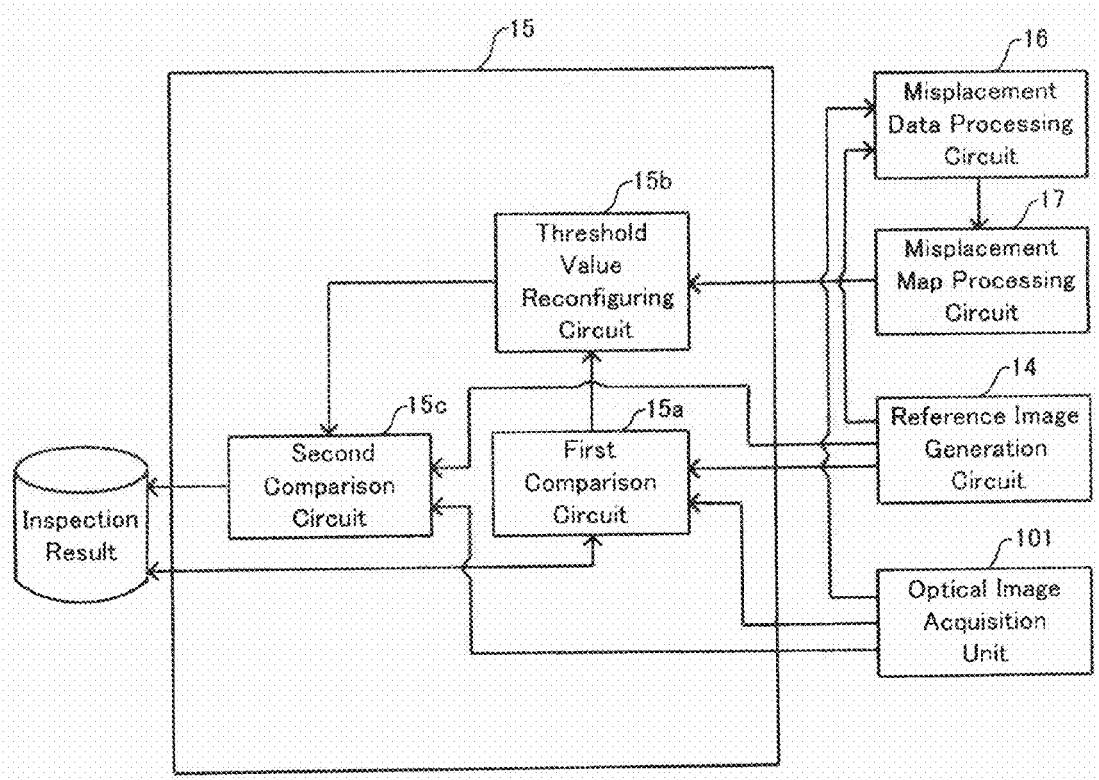
FIG. 5 is a diagram illustrating a configuration of a defect detection circuit according to the present embodiment.

As illustrated in FIG. 5, the defect detection circuit 15 includes a first comparison circuit 15a that is an example of the first comparison unit, a threshold value reconfiguring circuit 15b that is an example of the threshold reconfiguring unit, and a second comparison circuit 15c that is an example of the second comparison unit. The first comparison circuit 15a compares the input reference image and optical image to detect the defect. The threshold value reconfiguring circuit 15b specifies a portion of the misplacement map corresponding to a portion of the defect detected by the first comparison circuit 15a, and reconfigures the threshold value according to the misplacement amount of the specified portion and an error tendency of the defect. The second comparison circuit 15c compares the reference image and optical image of the specified defect portion using the threshold value reconfigured by the threshold value reconfiguring circuit 15b.

The first comparison circuit 15a compares the reference image input from the reference image generation circuit 14 and the optical image input from the optical image acquisition unit 101. In the first comparison circuit 15a, the pattern shape defect is detected based on a difference in pattern shape by the comparison, and the coordinate of the portion determined to be the defect by the comparison is specified.

The information on the defective portion determined to be the defect by the first comparison circuit 15a is input to the threshold value reconfiguring circuit 15b. The misplacement map that is the in-plane distribution of the misplacement of the mask 1 generated by the misplacement map processing circuit 17 is input to the threshold value reconfiguring circuit 15b.

In the threshold value reconfiguring circuit 15b, a portion of the misplacement map corresponding to the defective portion is specified, and the threshold value is reconfigured according to a deviation tendency of the optical image of the specified portion, and a deviation tendency of the defect of the specified portion. The deviation tendency of the optical image is the misplacement direction of the optical image with respect to the reference image. On the other hand, the deviation tendency of the defect is the shape of the defect, that is, whether the defect is convex or concave.

Specifically, a direction of the misplacement of the pattern which is specified from the misplacement map is determined. When the direction of the misplacement of the pattern of the defective portion is determined, whether the defect is convex or concave is determined. As illustrated by a list in FIG. 6A, as one example, the threshold value is reconfigured according to the determinations.

In the threshold value reconfiguring circuit 15b, in the case that the optical image deviates leftward with respect to the reference image as illustrated in FIG. 6A, the threshold value is decreased for the defect convex leftward from the optical image, the threshold value is increased for the defect convex rightward from the optical image, the threshold value is increased for the defect concave leftward from the optical image, and the threshold value is decreased for the defect concave rightward from the optical image.

Further, in the threshold value reconfiguring circuit 15b, in the case that the optical image deviates rightward with respect to the reference image, the threshold value is increased for the defect convex leftward from the optical image, the threshold value is decreased for the defect convex rightward from the optical image, the threshold value is decreased for the defect concave leftward from the optical image, and the threshold value is increased for the defect concave rightward from the optical image.

Further, in the threshold value reconfiguring circuit 15b, in the case that the optical image deviates upward with respect to the reference image as illustrated in FIG. 6B, the threshold value is decreased for the defect convex upward from the optical image, the threshold value is increased for the defect convex downward from the optical image, the threshold value is increased for the defect concave upward from the optical image, and the threshold value is decreased for the defect concave downward from the optical image.

Further, in the threshold value reconfiguring circuit 15b, in the case that the optical image deviates downward with respect to the reference image, the threshold value is increased for the defect convex upward from the optical image, the threshold value is decreased for the defect convex downward from the optical image, the threshold value is decreased for the defect concave upward from the optical image, and the threshold value is increased for the defect concave downward from the optical image.

The term "the defect is convex (hereinafter, referred to as a convex defect)" means a shape defect in which the defect is generated in the pattern so as to be increased (thickened) toward the outside of the pattern, and may include the case that the line width is locally thickened. The term "the defect is concave (hereinafter, referred to as a concave defect)" means a shape defect in which the defect is generated in the pattern so as to be decreased (thinned) toward the inside of the pattern, and may include the case that the line width is locally thinned.

An example of a light amount distribution of the frame in the case that the misplacement generated in the pattern will be described below with reference to FIGS. 7A to 9. As described above, in the mask inspection, the reference image is compared to the optical image to detect the defect in the frame having the size of tens micrometers in the mask. The misplacement amount of the pattern is measured between the reference image and optical image in the frame, and the size map of the misplacement of the pattern, namely, the misplacement map is generated in units of frames in the surface of the mask.

Figure 7A:
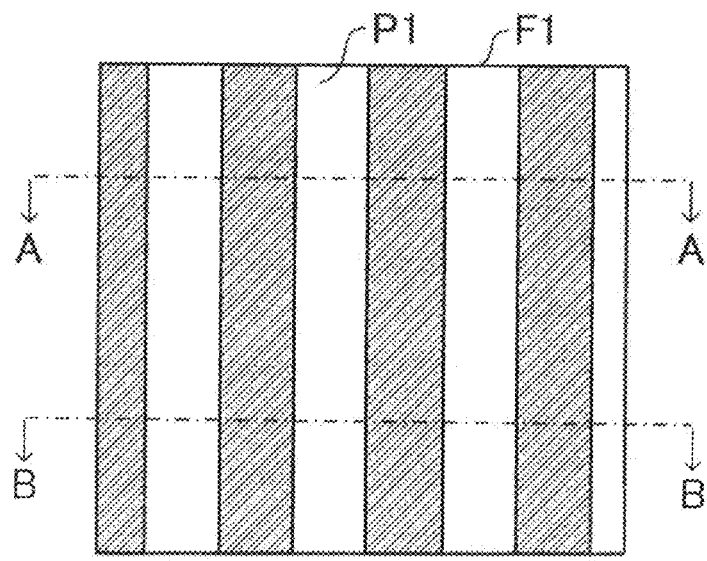
FIG. 7A is a schematic view illustrating an example of a frame.

FIG. 7A illustrates a frame F1 that is an example of the frame of the reference image. In FIG. 7A, a hatched portion indicates a transmissive region formed by a glass exposure portion with no film, and a portion that is not hatched indicates a region formed by a light shielding film or a semi-transparent film having a light shielding effect, namely, the pattern. The same manner is applied in the case in FIG. 7B.

FIG. 7B illustrates a frame F2 of the optical image corresponding to the frame F1 in FIG. 7A. The frame F2 is formed by a combination of the defective portion detected by the first comparison circuit 15a and the frame corresponding to the defective portion of the misplacement map generated by the misplacement map processing circuit 17. In the example, as illustrated in FIGS. 7A and 7B, a pattern P2 of the optical image deviates leftward with respect to a pattern P1 of the reference image.

FIG. 8 is a light amount distribution diagram illustrating a light amount in a cross section on a horizontally auxiliary line A-A in FIGS. 7A and 7B. In FIG. 8, a vertical axis indicates the light amount, a horizontal axis indicates a position, a solid line indicates a light amount distribution of the optical image, and a broken line indicates a light amount distribution of the reference image.

FIG. 8 illustrates an example in which the convex defect is located on the left of the optical image when the optical image deviates leftward with respect to the reference image. In this case, the threshold value reconfiguring circuit 15b decreases the threshold value in the reconfiguring process. That is, because the convex defect is on the left on the line A-A of the pattern P2 in FIG. 7B, a large influence is generated as illustrated in FIG. 8. Accordingly, in this case, it is found that the threshold value is strictly reconfigured.

FIG. 9 is a light amount distribution diagram illustrating a light amount in a cross section on a horizontally auxiliary line B-B in FIGS. 7A and 7B. In FIG. 8, a vertical axis indicates the light amount, a horizontal axis indicates a position, a solid line indicates a light amount distribution of the optical image, and a broken line indicates a light amount distribution of the reference image.

FIG. 9 illustrates an example in which the convex defect is located on the right of the optical image when the optical image deviates leftward with respect to the reference image. In this case, the threshold value reconfiguring circuit 15b increases the threshold value in the reconfiguring process. That is, because the convex defect is on the right on the line B-B of the pattern P2, a small influence is generated as illustrated in FIG. 9. Accordingly, in this case, it is found that the threshold value is reconfigured as an increased threshold value.

When the threshold value reconfiguring circuit 15b reconfigures the threshold value as described above, the second comparison circuit 15c detects the defect using the reconfigured threshold value. That is, in the second comparison circuit 15c, the optical image (frame) in which the defect is detected using the reconfigured threshold value is compared with the corresponding reference image to detect the defect again. Thus, the second comparison circuit 15c reconfigures the threshold value to detect the defect. Thereby it is possible to prevent the detection of the false defect.

The inspection result of the second comparison circuit 15c, for example, can be stored in the storage device 21, and the operator can then confirm the inspection result by browsing the stored inspection result from the storage device 21 on the display device 22 such as a monitor. The storage device 21 is, for example, a magnetic disk device, a magnetic tape device, an FD, a semiconductor memory, or the like. The inspection result of the first comparison circuit 15a can also be stored in the storage device 21.

In the first comparison circuit 15a and the second comparison circuit 15c, a comparison determination algorithm is used in which transmission images and reflection images are combined. As a result of the comparison, in the case that a difference between the two exceeds a predetermined threshold value, the position is determined to be a defect. Furthermore, rather than transmission images and reflection images being combined, a transmission image can be compared with another transmission image, or a reflection image can be compared with another reflection image.

FIGS. 7A to 9 illustrate the vertical line-and-space pattern portion, and the defects are generated on the right and left of the pattern. Similarly, when the defects are generated above and below the pattern in the horizontal line-and-space pattern portion, the threshold value reconfiguring circuit 15b reconfigures the threshold value, and the second comparison circuit 15c detects the defect using the reconfigured threshold value.

Next, the inspection result stored is transmitted to, for example, a review tool 310 as shown in FIG. 3 for review by an operator. The review tool 310 may be one of the components included in the mask inspection apparatus 100. Alternatively, the review tool 310 may be an external device of the mask inspection apparatus 100.

The review by the review tool 310 is an operation that determines whether a defect detected by the operator can be a practical problem. For example, the operator compares the reference image as the basis for the defect determination to the optical image including the defect to determine whether the defect requires repair.

The defect information determined in the review tool 310 is stored in the storage device 21, for example. When even one defect to be repaired is confirmed in the review tool 310, the mask 1 is sent to a repair device 330, which is an external device of the mask inspection apparatus 100, along with a defect information list 320 as shown in FIG. 3. Since the repair method is different according to the type of the defect, for example, whether the defect is convex or concave, the type of the defect including discrimination between the convex and concave defects and the coordinate of the defect are added to the defect information list 320.

Figure 10:
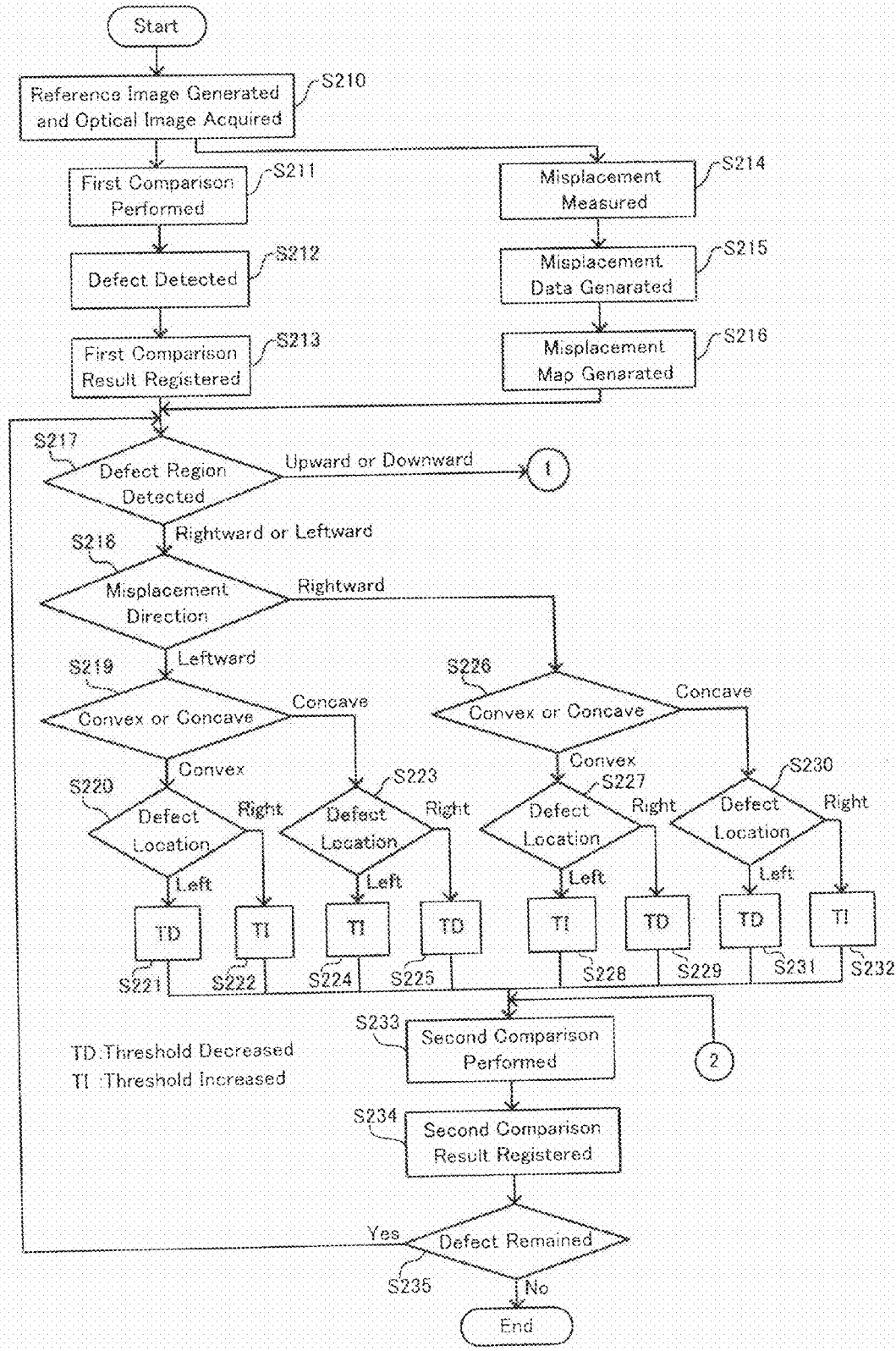
FIG. 10 is a flowchart illustrating a process of a mask inspection apparatus according to the present embodiment.
Figure 11:
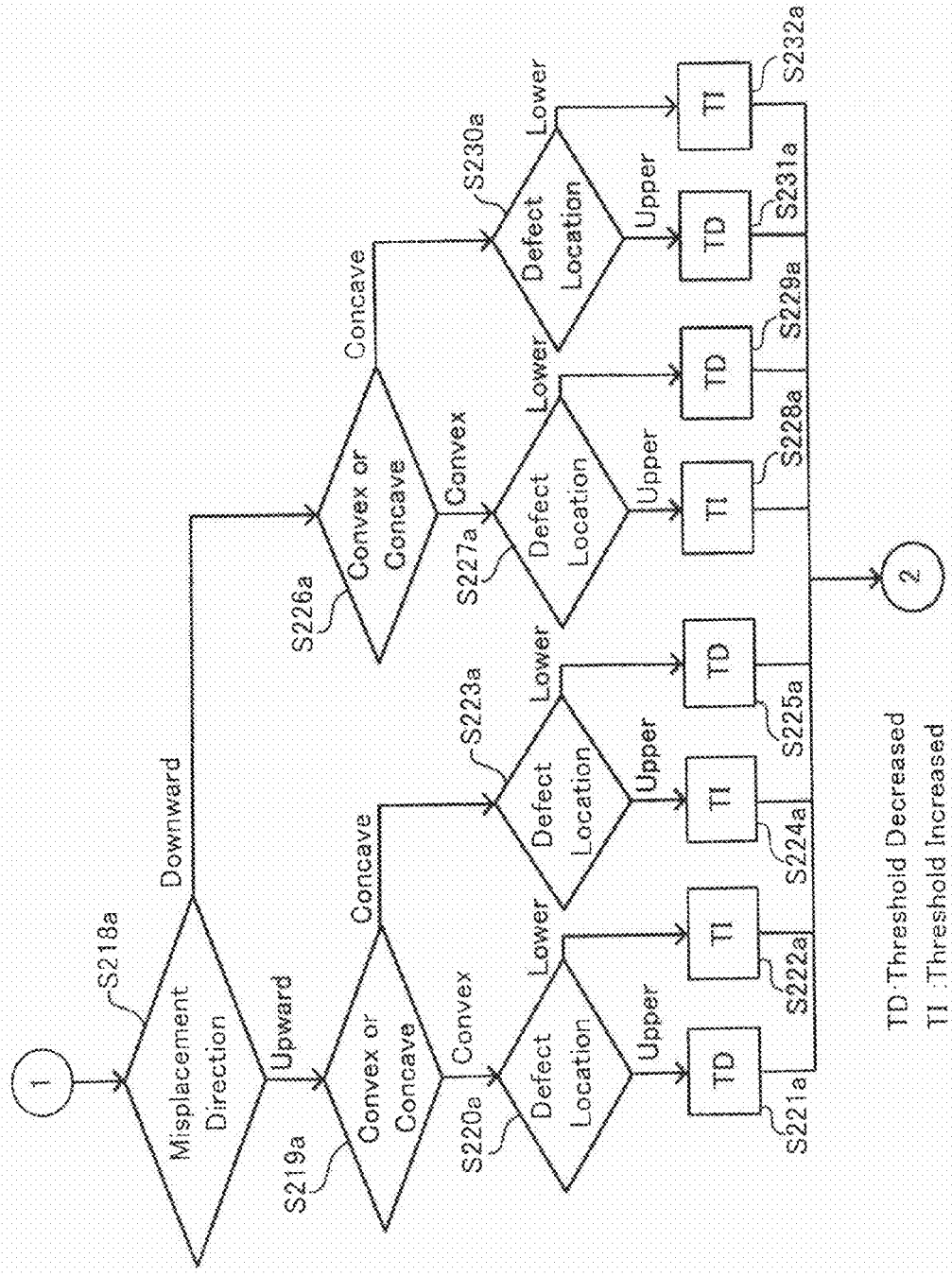
FIG. 11 is a flowchart illustrating a process of a mask inspection apparatus according to the present embodiment.

Next, a mask inspection method using the mask inspection apparatus 100 according to the present embodiment will be described referring to FIG. 10 and FIG. 11. FIG. 10 and FIG. 11 are flowcharts illustrating the mask inspection method using the mask inspection apparatus 100 according to the present embodiment.

The defect inspection is started for the mask 1 positioned on the stage 2. When the defect inspection is started for the mask 1, the optical image acquisition unit 101 acquires the optical image of the mask 1, and the reference image generation circuit 14 generates the reference image (both Step S210).

The optical image acquired in Step S210 and the reference image generated in Step S210 are input to each of the defect detection circuit 15 and the misplacement data processing circuit 16. In the defect detection circuit 15, the first comparison circuit 15a performs the first comparison (Step S211).

In the first comparison of Step S211, using a predetermined threshold value, the optical image and the reference image are compared with each other in units of frames to detect the defect (Step S212). The first comparison result is registered in the storage device 21 (Step S213).

On the other hand, in the misplacement data processing circuit 16 to which the optical image and the reference image are input, the misplacement amount of the optical image and reference image is measured in units of frames (Step S214). Then the misplacement data is generated (Step S215).

The misplacement data generated in Step S215 is input to the misplacement map processing circuit 17 to generate the misplacement map that is the in-plane distribution of the mask 1 (Step S216).

Since Step S217, a portion of the misplacement map corresponding to the defective portion detected in Step S212 is specified. Then the threshold value of the defect determination algorithm according to the misplacement direction of the optical image of the specified portion and the shape of the defect, is reconfigured. After that, the reference image and optical image of the specified portion using the reconfigured threshold value are re-compared.

In Step S217, the information on the defect detected by the first comparison and the information on the misplacement map are input to the threshold value reconfiguring circuit 15b to detect the misplacement amount corresponding to the defect region where the defect is detected. That is, the misplacement amount of the pattern in the misplacement map corresponding to the pattern in which the defect is detected is detected in Step S217.

Further, in Step S217, the threshold value reconfiguring circuit 15b determines using the misplacement map whether the optical image deviates upward with respect to the reference image, whether the optical image deviates downward with respect to the reference image, whether the optical image deviates leftward with respect to the reference image, or whether the optical image deviates rightward with respect to the reference image. That is, the threshold value reconfiguring circuit 15b determines which one of the directions the misplacement is oriented toward.

Next, when the misplacement is determined to be right or left direction (right or left in Step S217), the threshold value reconfiguring circuit 15b determines whether the optical image deviates rightward or leftward with respect to the reference image (Step S218). When the optical image deviates leftward, whether the defect is the convex defect or the concave defect is determined (Step S219).

When the defect is determined to be the convex defect in Step S219, whether the defect is located on the right or left of the pattern having the defect is determined (Step S220). When the defect is deviated to the left, the threshold value is reconfigured so as to be decreased (Step S221).

The second comparison circuit 15c performs the second comparison between the optical image and reference image of the defective portion using the reconfigured threshold value (Step S233). The second comparison result is registered in the storage device 21 (Step S234).

Next, when the defect detected by the first comparison remains, the flow goes to Step S217 (Yes in Step S235). When the defect does not remain, the defect inspection is ended for the mask 1 (No in Step S235). At this point, the first comparison result registered in Step S213 may be deleted.

On the other hand, whether the defect is located on the right or left of the pattern having the defect is determined (Step S220). When the defect is deviated to the right, the threshold value is reconfigured so as to be increased (Step S222). Then, the flow goes from Step S233 to S235.

On the other hand, when the defect is determined to be the concave defect (Step S219), whether the defect is located on the right or left of the pattern having the defect is determined (Step S223). When the defect is deviated to the left, the threshold value is reconfigured so as to be increased (Step S224). Then, the flow goes from Step S233 to S235.

On the other hand, whether the defect is located on the right or left of the pattern having the defect is determined (Step S223). When the defect is deviated to the right, the threshold value is reconfigured so as to be is decreased (Step 225). Then, the flow goes from Step S233 to S235.

The threshold value reconfiguring circuit 15b determines whether the optical image deviates rightward or leftward with respect to the reference image (Step S218). When the optical image deviates rightward, whether the defect is the convex defect or the concave defect is determined (Step S226).

When the defect is determined to be the convex defect (Step S226), whether the defect is located on the right or left of the pattern having the defect is determined (Step S227). When the defect is deviated to the left, the threshold value is reconfigured so as to be increased (Step S228). Then, the flow goes from Step S233 to S235.

On the other hand, whether the defect is located on the right or left of the pattern having the defect is determined (Step S227). When the defect is deviated to the right, the threshold value is reconfigured so as to be decreased (Step S229). Then, the flow goes from Step S233 to S235.

On the other hand, when the defect is determined to be the concave defect (Step S226), whether the defect is located on the right or left of the pattern having the defect is determined (Step S230). When the defect is deviated to the left, the threshold value is reconfigured so as to be decreased (Step S231). Then, the flow goes from Step S233 to S235.

On the other hand, whether the defect is located on the right or left of the pattern having the defect is determined (Step S230). When the defect is deviated to the right, the threshold value is reconfigured so as to be increased (Step S232). Then, the flow goes from Step S233 to S235.

The vertical line-and-space pattern extending in the vertical direction (vertical stripe) was described in the above. On the other hand, in the horizontal line-and-space pattern extending in the horizontal direction (horizontal stripe), when the misplacement is determined to be up or down direction (up or down in Step S217), the threshold value reconfiguring circuit 15b determines whether the optical image deviates upward or downward with respect to the reference image (Step S218a). When the optical image deviates upward, whether the defect is the convex defect or the concave defect is determined (Step S219a).

When the defect is determined to be the convex defect in Step S219a, whether the defect is located upward or downward of the pattern having the defect is determined (Step S220a). When the defect is deviated upward, the threshold value is reconfigured so as to be decreased (Step S221a).

The second comparison circuit 15c performs the second comparison between the optical image and reference image of the defective portion using the reconfigured threshold value (Step S233). The second comparison result is registered in the storage device 21 (Step S234).

Next, when the defect detected by the first comparison remains, the flow goes to Step S217 (Yes in Step S235). When the defect does not remain, the defect inspection is ended for the mask 1 (No in Step S235). At this point, the first comparison result registered in Step S213 may be deleted.

On the other hand, whether the defect is located upward or downward of the pattern having the defect is determined (Step S220a). When the defect is deviated downward, the threshold value is reconfigured so as to be increased (Step S222a). Then, the flow goes from Step S233 to S235.

On the other hand, when the defect is determined to be the concave defect (Step S219a), whether the defect is located upward or downward of the pattern having the defect is determined (Step S223a). When the defect is deviated upward, the threshold value is reconfigured so as to be increased (Step S224a). Then, the flow goes from Step S233 to S235.

On the other hand, whether the defect is located upward or downward of the pattern having the defect is determined (Step S218a). When the defect is deviated downward, the threshold value is reconfigured so as to be decreased (Step S225a). Then, the flow goes from Step S233 to S235.

On the other hand, whether the optical image deviates upward or downward with respect to the reference image is determined (Step S218a). When the optical image deviates downward, whether the defect is the convex defect or the concave defect is determined (Step S226a).

Then, when the defect is determined to be the convex defect (Step S226a), whether the defect is located on the upside or downside of the pattern having the defect is determined (Step S227a). When the defect is deviated upward, the threshold value is reconfigured so as to be increased (Step S228a). Then, the flow goes from Step S233 to S235.

On the other hand, whether the defect is located upward or downward of the pattern having the defect is determined (Step S227a). When the defect is deviated downward, the threshold value is reconfigured so as to be decreased (Step S229a). Then, the flow goes from Step S233 to S235.

When the defect is determined to be the concave defect (Step S226a), whether the defect is located on the upside or downside of the pattern having the defect is determined (Step S230a). When the defect is deviated upward, the threshold value is reconfigured so as to be decreased (Step S231a). Then, the flow goes from Step S233 to S235.

On the other hand, whether the defect is located upward or downward of the pattern having the defect is determined (Step S230a). When the defect is deviated downward, the threshold value is reconfigured so as to be increased (Step S232a). Then, the flow goes from Step S233 to S235.

According to the mask inspection apparatus and mask inspection method of the embodiment, the mask inspection apparatus 100 that inspects the mask 1 by the die-to-database comparison inspection method includes the misplacement map function of obtaining the reference image and the optical image in the surface of the mask with predetermined grid density (frame) to calculate and measure the misplacement amount with the real pattern. The mask inspection apparatus 100 can also obtains the misplacement map during the inspection process of the mask 1.

According to the present embodiment, the misplacement map is obtained, and the portion of the misplacement map corresponding to the convex defect generated at the pattern edge portion is specified. When the misplacement direction of the optical image of the specified portion is leftward, defect determination threshold value which is stricter than usual is applied. Thereby the defect can be accurately detected, and only the portion that really has the influence as the defect can reasonably be pointed out.

Further according to the present embodiment, the portion of the misplacement map corresponding to the convex defect generated at the pattern edge portion is specified. When the misplacement direction of the optical image of the specified portion is rightward, defect determination threshold value which is more permissive than usual is applied. Thereby the defect can be accurately detected, and only the portion that really has the influence as the defect can reasonably be pointed out.

Further according to the present embodiment, the portion of the misplacement map corresponding to the convex defect generated at the pattern edge portion is specified. When the misplacement direction of the optical image of the specified portion is upward, defect determination threshold value which is stricter than usual is applied. Thereby the defect can be accurately detected, and only the portion that really has the influence as the defect can reasonably be pointed out.

Further according to the present embodiment, the portion of the misplacement map corresponding to the convex defect generated at the pattern edge portion is specified. When the misplacement direction of the optical image of the specified portion is downward, defect determination threshold value which is more permissive than usual is applied. Thereby the defect can be accurately detected, and only the portion that really has the influence as the defect can reasonably be pointed out.

In the embodiment, the pattern defective portion can be detected while the detection of the false defect is suppressed. The detection of the pattern defective portion can be applied to not only the shape defect but also the local line width error. For example, a Critical Dimension (CD) map function that is the size map of the pattern line width in the surface of the mask 1 and the misplacement map function can simultaneously be used.

In the embodiment, the reference image generated by the reference image generation circuit 14 and the optical image acquired by the optical image acquisition unit 101 are input to the defect detection circuit 15 and the misplacement data processing circuit 16. That is, the defect detection and the misplacement map generation are performed using the optical image acquired by the one-time scan.

Alternatively, the misplacement data and the misplacement map may be generated using the first optical image acquired by the first scan and the reference image, and the defect may be detected using the second optical image acquired by the second scan and the reference image. With this configuration, the misplacement map is generated in advance, so that the defect can more efficiently be detected.

The present invention is not limited to the embodiments described and can be implemented in various ways without departing from the spirit of the invention.

The above description of the present embodiment has not specified apparatus constructions, control methods, etc., which are not essential to the description of the invention, since any suitable apparatus construction, control methods, etc. can be employed to implement the invention. Further, the scope of this invention encompasses all inspection methods and inspection apparatuses employing the elements of the invention and variations thereof, which can be designed by those skilled in the art.

What is claimed is:
1. A mask inspection apparatus comprising:
a sensor that acquires an optical image of a pattern formed in a mask when a light source irradiates light on the mask;
a reference image generation unit configured by a program operating on a computer to generate a reference image corresponding to the optical image from design data of the pattern;
a defect detection unit configured by a program operating on a computer to detect a defect of the pattern by comparing the optical image with the reference image;

a misplacement data processing unit configured by a program operating on the computer to obtain a misplacement amount of the pattern from the optical image and the reference image, and to generate misplacement data using the misplacement amount and the coordinates of the pattern; and a misplacement map processing unit configured by a program operating on the computer to generate a misplacement map from the misplacement data, and output the misplacement map to the defect detection unit, the misplacement map being in-plane distribution data of the mask;

wherein the defect detection unit includes:

a first comparison unit configured by a program operating on the computer to compare the optical image and the reference image using a defect determination logic algorithm;

a threshold value reconfiguring unit configured by a program operating on the computer to specify a portion of the misplacement map corresponding to a portion of the defect detected by the first comparison unit, and to reconfigure a threshold value of the defect determination algorithm according to the shape of the defect and the misplacement direction of the optical image with respect to the reference image of the specified portion; and a second comparison unit configured by a program operating on the computer to re-compare the reference image and optical image of the specified portion using the reconfigured threshold value.

2. The mask inspection apparatus according to claim 1, wherein, in the threshold value reconfiguring unit, when the optical image deviates leftward with respect to the reference image, the threshold value is decreased when the shape of the defect is convex leftward in the optical image, the threshold value is increased when the shape of the defect is convex rightward in the optical image, the threshold value is increased when the shape of the defect is concave leftward in the optical image, and the threshold value is decreased when the shape of the defect is concave rightward in the optical image, when the optical image deviates rightward with respect to the reference image, the threshold value is increased when the shape of the defect is convex leftward in the optical image, the threshold value is decreased when the shape of the defect is convex rightward in the optical image, the threshold value is decreased when the shape of the defect is concave leftward in the optical image, and the threshold value is increased when the shape of the defect is concave rightward in the optical image, when the optical image deviates upward with respect to the reference image, the threshold value is decreased when the shape of the defect is convex upward in the optical image, the threshold value is increased when the shape of the defect is convex downward in the optical image, the threshold value is increased when the shape of the defect is concave upward in the optical image, and the threshold value is decreased when the shape of the defect is concave downward in the optical image, when the optical image deviates downward with respect to the reference image, the threshold value is increased when the shape of the defect is convex upward in the optical image, the threshold value is decreased when the shape of the defect is convex downward in the optical image, the threshold value is decreased when the shape of the defect is concave upward in the optical image, and the threshold value is increased when the shape of the defect is concave downward in the optical image.

3. A mask inspection method for inspecting a defect of a pattern formed in a mask by irradiating the mask with light, the mask inspection method comprising:

irradiating the mask with light to acquire an optical image of the pattern;

generating a reference image corresponding to the optical image from design data of the pattern;

detecting a defect of the pattern by comparing the optical image with the reference image using a defect determination algorithm;

obtaining a misplacement amount of the pattern from the optical image and the reference image, generating misplacement data using the misplacement amount and the coordinates of the pattern; and generating a misplacement map based on the misplacement data, the misplacement map being in-plane distribution data of the mask;

wherein in the detecting of the defect of the pattern, a portion of the misplacement map corresponding to a portion of the defect detected by comparing the optical image with the reference image is specified, and the threshold value of the defect determination algorithm according to the shape of the defect and the misplacement direction of the optical image with respect to the reference image of the specified portion, is reconfigured, and the reference image and optical image of the specified portion using the reconfigured threshold value are re-compared.

4. The mask inspection method according to claim 3, wherein, in the comparing of the reference image and optical image of the specified portion using the reconfigured threshold value, when the optical image deviates leftward with respect to the reference image, the threshold value is decreased when the shape of the defect is convex leftward in the optical image, the threshold value is increased when the shape of the defect is convex rightward in the optical image, the threshold value is increased when the shape of the defect is convex leftward in the optical image, and the threshold value is decreased when the shape of the defect is convex rightward in the optical image, when the optical image deviates rightward with respect to the reference image, the threshold value is increased when the shape of the defect is convex leftward in the optical image, the threshold value is decreased when the shape of the defect is convex rightward in the optical image, the threshold value is decreased when the shape of the defect is convex leftward in the optical image, and the threshold value is increased when the shape of the defect is convex rightward in the optical image, when the optical image deviates upward with respect to the reference image, the threshold value is decreased when the shape of the defect is convex upward in the optical image, the threshold value is increased when the shape of the defect is convex downward in the optical image, the threshold value is increased when the shape of the defect is convex upward in the optical image, and the threshold value is decreased when the shape of the defect is convex downward in the optical image, when the optical image deviates downward with respect to the reference image, the threshold value is increased when the shape of the defect is convex upward in the optical image, the threshold value is decreased when the shape of the defect is convex downward in the optical image, the threshold value is decreased when the shape of the defect is convex upward in the optical image, and the threshold value is increased when the shape of the defect is convex downward in the optical image.

5. A mask inspection apparatus comprising:

a sensor that acquires first and second optical images of a pattern formed in a mask when a light source irradiates light on the mask, the second optical image being acquired after the first optical image;

a reference image generation unit configured by a program operating on a computer to generate a reference image corresponding to the first optical image from design data of the pattern;

a defect detection unit configured by a program operating on a computer to detect a defect of the pattern by comparing the second optical image with the reference image;

a misplacement data processing unit configured by a program operating on the computer to obtain a misplacement amount of the pattern from the first optical image and the reference image, and to generate misplacement data using the misplacement amount and the coordinates of the pattern; and a misplacement map processing unit configured by a program operating on the computer to generate a misplacement map from the misplacement data, and output the misplacement map to the defect detection unit, the misplacement map being in-plane distribution data of the mask;

wherein the defect detection unit includes:

a first comparison unit configured by a program operating on the computer to compare the second optical image and the reference image using a defect determination logic algorithm;

a threshold value reconfiguring unit configured by a program operating on the computer to specify a portion of the misplacement map corresponding to a portion of the defect detected by the first comparison unit, and to reconfigure a threshold value of the defect determination algorithm according to the shape of the defect and a misplacement direction with respect to the reference image of the specified portion; and a second comparison unit configured by a program operating on the computer to re-compare the reference image and second optical image of the specified portion using the reconfigured threshold value.

6. The mask inspection apparatus according to claim 5, wherein, in the threshold value reconfiguring unit, when the first optical image deviates leftward with respect to the reference image, the threshold value is decreased when the shape of the defect is convex leftward in the second optical image, the threshold value is increased when the shape of the defect is convex rightward in the second optical image, the threshold value is increased when the shape of the defect is concave leftward in the second optical image, and the threshold value is decreased when the shape of the defect is concave rightward in the second optical image, when the first optical image deviates rightward with respect to the reference image, the threshold value is increased when the shape of the defect is convex leftward in the second optical image, the threshold value is decreased when the shape of the defect is convex rightward in the second optical image, the threshold value is decreased when the shape of the defect is concave leftward in the second optical image, and the threshold value is increased when the shape of the defect is concave rightward in the second optical image, when the first optical image deviates upward with respect to the reference image, the threshold value is decreased when the shape of the defect is convex upward in the second optical image, the threshold value is increased when the shape of the defect is convex downward in the second optical image, the threshold value is increased when the shape of the defect is concave upward in the second optical image, and the threshold value is decreased when the shape of the defect is concave downward in the second optical image, when the first optical image deviates downward with respect to the reference image, the threshold value is increased when the shape of the defect is convex upward in the second optical image, the threshold value is decreased when the shape of the defect is convex downward in the second optical image, the threshold value is decreased when the shape of the defect is concave upward in the second optical image, and the threshold value is increased when the shape of the defect is concave downward in the second optical image.

7. A mask inspection method for inspecting a defect of a pattern formed in a mask by irradiating the mask with light, the mask inspection method comprising:

first irradiating the mask with light to acquire a first optical image of the pattern;

second irradiating the mask with light to acquire a second optical image of the pattern after acquiring the first optical image of the pattern;

generating a reference image corresponding to the first optical image from design data of the pattern;

detecting a defect of the pattern by comparing the second optical image with the reference image using a defect determination algorithm;

obtaining a misplacement amount of the pattern from the first optical image and the reference image, generating misplacement data using the misplacement amount and the coordinates of the pattern; and generating a misplacement map based on the misplacement data, the misplacement map being in-plane distribution data of the mask;

wherein in the detecting of the defect of the pattern, a portion of the misplacement map corresponding to a portion of the defect detected by comparing the second optical image with the reference image is specified, and the threshold value of the defect determination algorithm according to the shape of the defect and a misplacement direction with respect to the reference image of the specified portion, is reconfigured, and the reference image and the second optical image of the specified portion using the reconfigured threshold value are re-compared.

8. The mask inspection method according to claim 7, wherein, in the comparing of the reference image and optical image of the specified portion using the reconfigured threshold value, when the first optical image deviates leftward with respect to the reference image, the threshold value is decreased when the shape of the defect is convex leftward in the second optical image, the threshold value is increased when the shape of the defect is convex rightward in the second optical image, the threshold value is increased when the shape of the defect is convex leftward in the second optical image, and the threshold value is decreased when the shape of the defect is convex rightward in the second optical image, when the first optical image deviates rightward with respect to the reference image, the threshold value is increased when the shape of the defect is convex leftward in the second optical image, the threshold value is decreased when the shape of the defect is convex rightward in the second optical image, the threshold value is decreased when the shape of the defect is convex leftward in the second optical image, and the threshold value is increased when the shape of the defect is convex rightward in the second optical image, when the first optical image deviates upward with respect to the reference image, the threshold value is decreased when the shape of the defect is convex upward in the second optical image, the threshold value is increased when the shape of the defect is convex downward in the second optical image, the threshold value is increased when the shape of the defect is convex upward in the second optical image, and the threshold value is decreased when the shape of the defect is convex downward in the second optical image, when the first optical image deviates downward with respect to the reference image, the threshold value is increased when the shape of the defect is convex upward in the second optical image, the threshold value is decreased when the shape of the defect is convex downward in the second optical image, the threshold value is decreased when the shape of the defect is convex upward in the second optical image, and the threshold value is increased when the shape of the defect is convex downward in the second optical image.

* * * * *